(12) United States Patent
Cheng

(10) Patent No.: US 6,684,112 B1
(45) Date of Patent: Jan. 27, 2004

(54) ROBUST MODEL-FREE ADAPTIVE CONTROL

(76) Inventor: George Shu-Xing Cheng, 135 Hopper La., Folsom, CA (US) 95630

( * ) Notice: Subject to any disclaimer, the term of this patent is extended or adjusted under 35 U.S.C. 154(b) by 455 days.

(21) Appl. No.: 09/832,379

(22) Filed: Apr. 11, 2001

Related U.S. Application Data

(60) Provisional application No. 60/196,444, filed on Apr. 11, 2000.

(51) Int. Cl.$^7$ ............................................. G05B 13/02
(52) U.S. Cl. ........................... 700/28; 700/40; 700/48; 700/52; 700/55; 700/37; 700/41; 700/42; 700/43; 700/39; 700/47; 700/49; 700/50; 700/54; 700/71; 700/72; 700/75; 700/76; 700/77; 706/14; 706/23; 706/16; 706/25
(58) Field of Search ............................. 700/28, 40, 52, 700/55, 37, 41–43, 39, 47, 48–50, 54, 71–72, 75–77; 706/14, 23, 16, 25

(56) References Cited

U.S. PATENT DOCUMENTS

| | | | | |
|---|---|---|---|---|
| 5,040,134 A | * | 8/1991 | Park ............................. | 706/34 |
| 5,159,660 A | * | 10/1992 | Lu et al. ....................... | 706/23 |
| 5,335,643 A | * | 8/1994 | Abate et al. ................. | 123/679 |
| 5,394,322 A | * | 2/1995 | Hansen ......................... | 700/37 |
| 5,486,996 A | * | 1/1996 | Samad et al. ................. | 700/32 |
| 5,498,943 A | * | 3/1996 | Kimoto et al. ............... | 318/601 |
| 5,513,098 A | * | 4/1996 | Spall et al. ................... | 700/38 |
| 5,517,418 A | * | 5/1996 | Green et al. .................. | 701/13 |
| 5,555,495 A | * | 9/1996 | Bell et al. ..................... | 700/38 |
| 5,642,722 A | * | 7/1997 | Schumacher et al. ........ | 123/673 |
| 5,668,717 A | * | 9/1997 | Spall ............................. | 706/23 |
| 5,673,367 A | * | 9/1997 | Buckley ....................... | 706/23 |
| 5,740,324 A | * | 4/1998 | Mathur et al. ................ | 706/16 |
| 5,748,467 A | * | 5/1998 | Qin et al. ..................... | 700/50 |
| 5,781,700 A | * | 7/1998 | Puskorius et al. ............ | 706/14 |
| 5,825,646 A | * | 10/1998 | Keeler et al. ................. | 700/44 |
| 5,992,383 A | * | 11/1999 | Scholten et al. ............. | 123/399 |
| 6,055,524 A | * | 4/2000 | Cheng .......................... | 706/23 |
| 6,360,131 B1 | * | 3/2002 | Cheng .......................... | 700/40 |
| 6,556,980 B1 | * | 4/2003 | Cheng .......................... | 706/23 |

OTHER PUBLICATIONS

J. C. Spall et al., "Model–Free Control of General Discrete–Time Systems," Proceeding of 32nd IEEE Conference on Decision and Control, vol. 3, pp. 2792–2797, Dec. 1993.*

* cited by examiner

*Primary Examiner*—Ramesh Patel
*Assistant Examiner*—Thomas Pham
(74) *Attorney, Agent, or Firm*—Stout, Uxa, Buyan & Mullins, LLP

(57) ABSTRACT

A Robust Model-Free Adaptive controller is disclosed for effectively controlling simple to complex systems including industrial processes, equipment, facilities, devices, engines, robots, vehicles, and appliances. Without the need of re-designing a controller or re-tuning the controller parameters, the inventive controller is able to provide a wide robust range and keep the system under automatic control during normal and extreme operating conditions when there are significant disturbances or changes in system dynamics. Because of its simplicity and capability, the control system is useful for building flexible and adaptive production systems to fulfill the on demand manufacturing needs of the new e-commerce environment.

17 Claims, 6 Drawing Sheets

ROBUST MODEL-FREE ADAPTIVE CONTROL

FIELD OF THE INVENTION

The invention relates to automatic control of simple to complex systems including industrial processes, equipment, facilities, devices, engines, robots, vehicles, and appliances, and more particularly to a method and apparatus for adaptively controlling continuous variables and providing a large user-defined robust range. The inventive controller is able to force the controlled variable to stay within a pre-defined robust range under significant system dynamic changes due to batch, load, production, configuration, or operating stage switches, and under large disturbances originating from wild product flows, plant upsets, wear and tear of sensors and valves, etc.

BACKGROUND OF THE INVENTION

The Model-Free Adaptive (MFA) control methodology described in U.S. patent application Ser. No. 08/944,450, and patent applications, Ser. No. 09/143,165 filed on Aug. 28, 1998, and Ser. No. 09/174,156 filed on Oct. 16, 1998 are able to deal with various complex systems in practice. However, MFA may be incapable of effectively controlling a system with the following situations:

a) There is a big change in the system dynamic so that a regular MFA controller is unable to provide prompt and adequate control action to meet the control performance criteria;

b) The dominant disturbance to the system cannot be economically measured so that feedforward compensation cannot be easily implemented;

c) The controller purposely de-tuned to minimize the variations in its manipulated variable may lose control when there is a large disturbance or significant dynamic behavior change; and d) The system dynamic behavior or load change does not provide triggering information to allow the control system to switch operating modes. Otherwise, a gain-scheduling adaptive controller or the multifunction MFA control system described in patent application Ser. No. 09/174,156 would be able to switch its controller gain or control strategies accordingly based on a triggering signal.

To describe the application in more detail, a chemical reactor control problem is studied in the following. Chemical batch reactors are critical operating units in the chemical processing industry. Controlling the batch reaction temperature is always a challenge due to the complex nature of the process, large potential disturbances, interactions between key variables, and multiple operating conditions. A large percentage of batch reactors running today cannot keep the reactor temperature in automatic control through out the entire operating period thus resulting in lower efficiency, wasted manpower and materials, and inconsistent product quality.

An exothermal batch reactor process typically has 4 operating stages:

a) Startup Stage: ramps up the reactor temperature by use of steam to a pre-defined reaction temperature.

b) Reaction and Holding Stage: holds the temperature by use of cooling water while chemical reaction is taking place and heat is being generated;

c) No-reaction and Holding Stage: holds the temperature by use of steam after main chemical reaction is complete and heat is not being generated; and d) Ending Stage: ramps down the reactor temperature for discharging the products.

During the transition period from Stage 2 to Stage 3, the reactor can change its nature rapidly from a heat-generation process to a heat-consumption process. This change happens without any triggering signal because the chemical reaction can end at anytime depending on the types of chemicals, their concentration, catalyst, and reaction temperature. Within a very short period of time, the reactor temperature can drop significantly. The control system must react quickly to cut-off the cooling water and send in a proper amount of steam to drive the reactor temperature back to normal. A regular feedback controller is not able to automatically control a batch reactor during this transition if it is tuned to control the process in Stages 1 and 2. In practice, batch reactors are usually switched to manual control and rely on well-trained operators during critical transitions. It is a tedious and nerve-wracking job that can result in low product quality and yield.

It is desirable to develop an automatic control system capable of controlling complex systems such as chemical batch reactors to improve control performance, plant efficiency, system safety, and product quality.

In this patent application, we introduce a Robust Model-Free Adaptive control system to control the problematic processes described. Robust control is usually referred to as a controller design method that focuses on the reliability (robustness) of the control algorithm. Robustness is defined as the minimum requirement a control system has to satisfy to be useful in a practical environment. Once the controller is designed, its parameters do not change and control performance is guaranteed. The control apparatus we introduce in this application is not a control system design method. We use the term 'robust' here because this novel control system is able to dramatically improve the control system robustness. Without the need of re-designing a controller, using feedforward compensation, or re-tuning the controller parameters, the inventive control system is able to keep the system in automatic control through normal and extreme operating conditions when there are significant disturbances or system dynamic changes.

SUMMARY OF THE INVENTION

The present invention overcomes the above-identified limitations of the prior art by using a specially designed Robust Model-Free Adaptive control system, which includes a Primary Controller and a set of Constraint Controllers. Since the additional parameters such as the Upper and Lower Bounds are easy for the user to provide, the control system is easy to setup and maintain. Robust MFA is able to dramatically improve the control system robustness. Without the need of re-designing a controller or re-tuning the controller parameters, the inventive control system is able to keep the process under automatic control during normal and extreme operating conditions when there are significant disturbances or changes in process dynamics. Because of its simplicity and capability, the control system is useful for building flexible and adaptive production systems to fulfill the on demand manufacturing needs in the new e-commerce environment.

DESCRIPTION OF THE PREFERRED EMBODIMENTS

A. Single-variable Robust Model-Free Adaptive Control

A single-variable Robust Model-Free Adaptive control system is introduced, which consists of a primary controller and two constraint controllers. The primary controller can control a process under normal operating conditions. Once the process has significant dynamic changes or load changes that drive the process variable outside a pre-defined boundary, one of the constraint controllers will take over and force the process variable back within its boundary. These two constraint controllers provide soft upper and lower boundaries for the process variable thereby effectively increasing the control system's robustness range.

In the batch reactor temperature control example, when the chemical reaction ends and the reactor temperature drops below a pre-defined boundary, the lower constraint controller will take over. This controller has different parameter settings and functions capable of dealing with the process in this special condition. It is able to quickly shut off the cooling valve and open the heating valve to force the reactor temperature back to track its setpoint. Once the temperature is back within its boundary and has crossed a pre-defined "holding zone", the constraint controller will release the job back to the primary controller. The switches between these controllers are seamless and do not rely on triggering signals, schedules, rules, or models.

Figure 1:
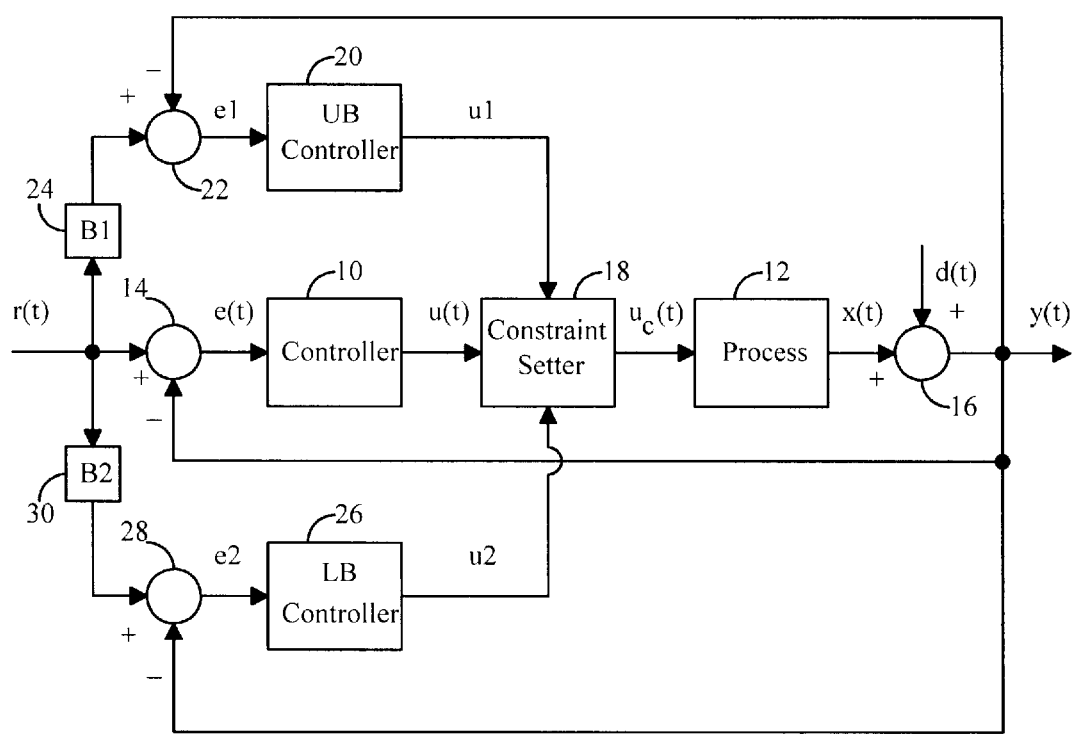
FIG. 1 is a block diagram illustrating a single-variable robust model-free adaptive control system according to this invention.

FIG. 1 illustrates a single variable robust model-free adaptive control system. It includes a primary controller 10, a single-input-single-output (SISO) process 12, signal adders 14 and 16. In addition, the system consists of a constraint setter 18, an upper-bound constraint controller 20, a signal adder 22, an upper-bound setpoint setter 24, a lower-bound constraint controller 26, a signal adder 28, and a lower-bound setpoint setter 30. The signals shown in FIG. 1 are as follows:

r(t)—Setpoint
y(t)—Process Variable or the Measured Variable, y(t)=x(t)+d(t).
x(t)—Process Output
u(t)—Primary Controller Output
d(t)—Disturbance, the disturbance caused by noise or load changes.
e(t)—Error between the Setpoint and Process Variable, e(t)=r(t)−y(t).
$r_1(t)$—Upper-bound Controller Setpoint
$r_2(t)$—Lower-bound Controller Setpoint
$u_1(t)$—Upper-bound Controller Output
$u_2(t)$—Lower-bound Controller Output
$u_c(t)$—The Combined Controller Output
$e_1(t)$—Error between $r_1(t)$ and y(t), $e_1(t)=r_1(t)-y(t)$.
$e_2(t)$—Error between $r_2(t)$ and y(t), $e_2(t)=r_2(t)-y(t)$.

The functions of elements 10, 12, 14, and 16 have been described in the patent applications, Ser. No. 08/944,450 and Ser. No. 09/143,165, which are herein incorporated by reference. As disclosed in more detail in the above patent applications, the MFA controller 10 consists of a learning neural network with a multi-node input layer to which time-delayed functions of an error signal e(t) are applied, a multi-neuron hidden layer which sums the outputs of the input layer nodes individually weighted by weighting factors $w_{ij}(n)$, and a single-neuron output layer which sums functions of the outputs of the hidden layer neurons individually weighted by weighting factors $h_j(n)$. The output u(t) of the neural network is a function of the output of the output layer neuron.

In patent application Ser. No. 09/174,156 filed on Oct. 16, 1998, we disclosed a general-purpose control constraint handling method. It described the control limits as the hard boundaries for controller output and the control constraints as the soft boundaries for controller output. In practical applications, control limits may not be sufficient to deal with complex situations such as the stage transition described in the batch reactor control application. Controller constraints dynamically set "intelligent" boundaries for the controller output under complex situations so as to allow the system to run close to its physical limitations.

The Upper-bound and Lower-bound Constraint Controllers in the Robust model-free Adaptive control system are developed based on the basic concept of the constraint handling method. However, the difference here is that the boundaries are for the controlled Process Variable (PV) instead of the controller Output (OP).

1. Upper and Lower Bound

As shown in FIG. 1, controllers 20 and 26 are used as the Upper-bound and Lower-bound constraint controllers, respectively, which provide "intelligent" upper and lower boundaries for Process Variable y(t). The constraint setter 18 forces u(t) to be bounded by the controller outputs $u_1$ and $u_2$ under certain conditions.

To setup this Robust Model-Free Adaptive control system, the user is allowed to enter an Upper-bound (UB) and a Lower-bound (LB) for the Process Variable (PV). These bounds are typically the marginal values that the Process Variable should not go beyond. PV is unlike OP where a hard limit or constraint can be set. PV is a measured variable that can only be controlled by manipulating the OP. Therefore, the Upper and Lower bounds for PV are very different than the OP constraints.

These bounds can be set based on, but not limited to, the following options.

Case 1. Setting an Actual Bound

If the Upper-bound can be set in an actual value, let $$r_1(t)=UB, \qquad (1)$$

where UB>r(t) is the Upper-bound with the same unit of the Process Variable, and $r_1(t)$ is the Setpoint of the UB Controller.

If the Lower-bound can be set in an actual value, let $$r_2(t)=LB, \qquad (2)$$

where LB<r(t) is the Lower-bound with the same unit of the Process Variable, and $r_2(t)$ is the Setpoint of the LB Controller.

Case 2. Setting a Relative Bound

If the Upper-bound is biased from the primary controller setpoint, let $$r_1(t)=r(t)+B_1, \quad (3)$$

where $B_1>0$ is a relative bound to the setpoint r(t).

If the Lower-bound is biased from the primary controller setpoint, let $$r_2(t)=r(t)-B_2, \quad (4)$$

where $B_2>0$ is a relative bound to the setpoint r(t).

For instance, if we let $B_1=B_2=10\%$, a +/−10% upper and lower bound is set around the setpoint r(t). The bounds move with the setpoint change. This is useful for processes whose setpoints are ramping up or down during different operating conditions.

Case 3. Setting a Function Bound

If the Upper-bound can be represented by a function, let $$r_1(t)=f_u(.), \quad (5)$$

where $f_u(.)$ is a single variable or multi-variable function.

If the Lower-bound can be represented by a function, let $$r_2(t)=f_l(.), \quad (6)$$

where $f_l(.)$ is a single variable or multi-variable function.

For instance, if we let $f_u(r(t))=ar(t)+b$, where a and b are constants, r(t) is the setpoint, the upper bound is a linear function to the setpoint.

2. Constraint Setter

The constraint setter 18 is a limit function $f_c(.)$ that combines the controller output signal based on the following logic:

$$u_c(t)=u_1(t), \text{ if } u(t)>u_1(t) \quad (7a)$$

$$u_c(t)=u(t), \text{ if } u_2(t) \leq u(t) \leq u_1(t) \quad (7b)$$

$$u_c(t)=u_2(t), \text{ if } u(t)<u_2(t) \quad (7c)$$

where $u_1(t)$ is the output of UB controller, $u_2(t)$ is the output of LB controller, u(t) is the output of primary controller, $u_c(t)$ is the output of the limit function $f_c(.)$ and is used as the actual control signal to the process.

3. Control Actions

Without losing its generality, we study a few cases to see how the robust control system works.

In a normal situation, y(t) tracks r(t), e(t) is very close to 0. If the UB bound is set based on Equation (3), the UB controller error $e_1(t)$ can be estimated by $$e_1(t)=r_1(t)-y(t)=r(t)+B_1-y(t)\approx B_1. \quad (8)$$

Since B1 is a relatively large positive value, the related $e_1(t)$ will drive the UB controller output $u_1$ to increase and sit eventually at the upper control limit.

Similarly, if the LB bound is set based on Equation (2), where LB<r(t), $e_2(t)$ is estimated by $$e_2(t)=r_2(t)-y(t)=LB-y(t). \quad (9)$$

Since LB is considerably smaller than r(t), $e_2(t)$ remains a relatively large negative value, which will drive the LB controller output $u_2(t)$ to decrease and sit eventually at the lower control limit. In this case, the combined controller output $u_c(t)=u(t)$, according to Equation (7b). That is, the output of the primary controller can move freely within its limits.

In a situation where the process variable y(t) suddenly drops below the Lower-bound LB, $e_2(t)$ becomes a positive value. Since the LB Controller is set much more aggressively than the Primary Controller, its output $u_2(t)$ will quickly increase and become larger than u(t). The combined controller output $u_c(t)$ is equal to $u_2(t)$, according to Equation (7c). The strong control action of the LB controller will force the process variable to move back above the Lower-bound. Similar control action will take place for the UB Controller if the value of the process variable goes above the Upper-bound. The strong control action of the UB Controller will force the process variable to move back below the Upper-bound.

4. Upper and Lower Bond Zone

To improve control performance, it is desirable to allow a constraint controller to carry on its control action for a sufficient period of time once it is triggered. This means the constraint controller will not release its control to the primary controller after the process variable goes back within the bounds. If the constraint controller releases its control action too soon, the process variable may easily go outside the bound again due to the weaker control action of the primary controller.

Figure 2:
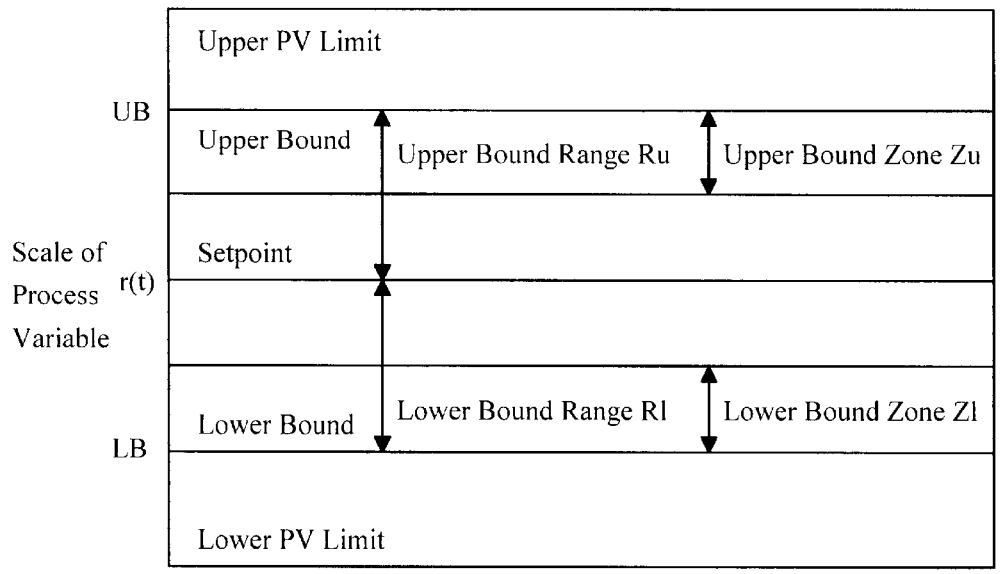
FIG. 2 is a chart that illustrates the Bound, Bound Range, and Bound Zone.
Figure 3:
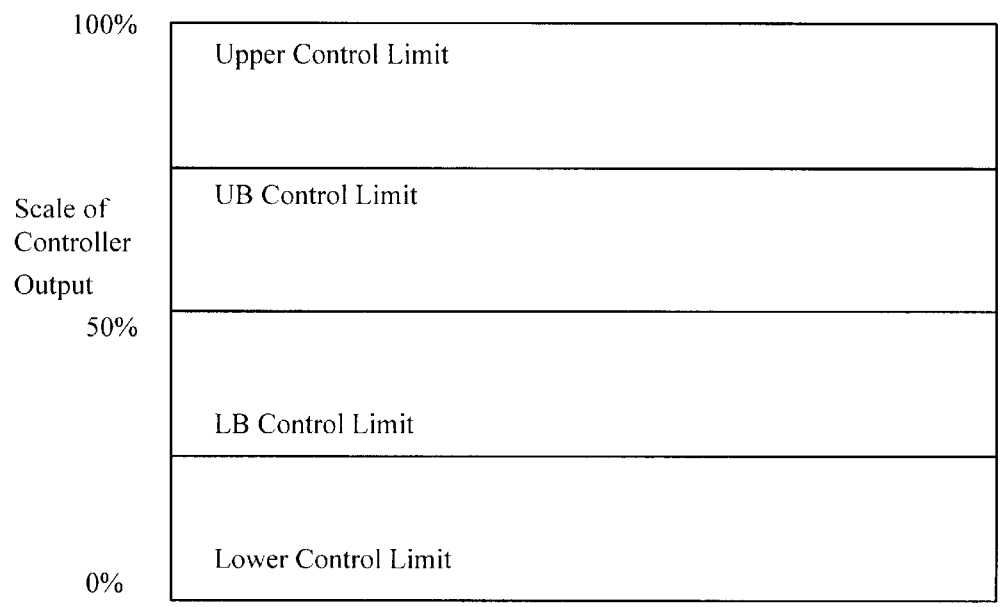
FIG. 3 is a chart that illustrates the Control Limits for the primary controller and constraint controllers.

For this reason, a Bound Zone is added to the system. It is a zone where a signal is not triggered unless it exceeds the zone. The concept of a Bound Zone is illustrated in FIG. 2 and the signals used in the figure are defined and listed in the following:

r(t)—Setpoint
UB—Upper Bound
LB—Lower Bound
$R_u$—Upper Bound Range
$R_l$—Lower Bound Range
α—Bound Ratio in %
$Z_u$—Upper Bound Zone
$Z_l$—Lower Bound Zone The signals are calculated based on these formulas:

$$R_u=UB-r(t) \quad (10a)$$

$$R_l=r(t)-LB \quad (10b)$$

$$Z_u=\alpha R_u \quad (11a)$$

$$Z_l=\alpha R_l \quad (11b)$$

For instance, if we set a default value for the Bound Ratio α=50%, and let r(t)=50, UB=80, LB=10, then $Z_u$=0.5*(80−50)=15, and $Z_l$=0.5* (50−10)=20.

5. Upper and Lower Constraint Control Limits (CCL)

During normal situations, the UB Controller output will sit at an Upper Control Limit and the LB Controller output will sit at a Lower Control Limit. The Upper and Lower Control Limits of the Primary Controller should be the hard control limits for the control system and can also be used as the limits for the constraint controllers.

However, the control limits can affect the time it takes for a constant controller to reach its working range. For instance, if the regular upper control limit is 100%, the UB controller's output will sit at 100% during normal operations. Once the PV reaches its Upper Bound and triggers the control action for the UB controller, it will take the output of the UB controller quite a while to travel from 100% to its control range, say 60%. In this situation, if the controller sits at 80%, the distance for the controller output to travel will be much shorter so that rapid control action can be realized.

Therefore, it is wise to design a different upper control limit for the UB controller and a lower control limit for the LB controller. The proper setting of the limits for the constraint controllers will help to provide rapid control actions. Of course, too close of a control limit will reduce the control system flexibility. Therefore, the constant control limits should allow the user to configure with a neutral default setting.

6. Constraint Controller Parameters

Regular MFA controllers are used for the primary controller and two constraint controllers. The MFA controller parameters have been described in the patent application, Ser. No. 09/143,165, which include:

$K_c$—MFA controller Gain $T_c$—MFA controller Time Constant

If the primary controller is set with $K_c$ and $T_c$, the constraint controller can be set based on, but not limited to, the following formula:

$$K_{c1}=\alpha_1 K_c \quad (12a)$$

$$T_{c1}=\beta_1 T_c \quad (12b)$$

$$K_{c2}=\alpha_2 K_c \quad (13a)$$

$$T_{c2}=\beta_2 T_c \quad (13b)$$

where $K_{c1}$, $K_{c2}$, $T_{c1}$, and $T_{c2}$, are the MFA Controller Gain and Time Constant for the UB and LB constraint controllers, respectively; and $\alpha_1$, $\alpha_2$, $\beta_1$, and $\beta_2$ are positive coefficients that can be pre-set with default values or re-configured by the user.

Typically, we can let $\alpha_1=\alpha_2=3$, and $\beta_1=\beta_2=0.7$. That means, the constraint controllers will have a quite stronger gain and react faster compared to the Primary controller.

B. Anti-delay Robust Model-Free Adaptive Control System

Figure 4:
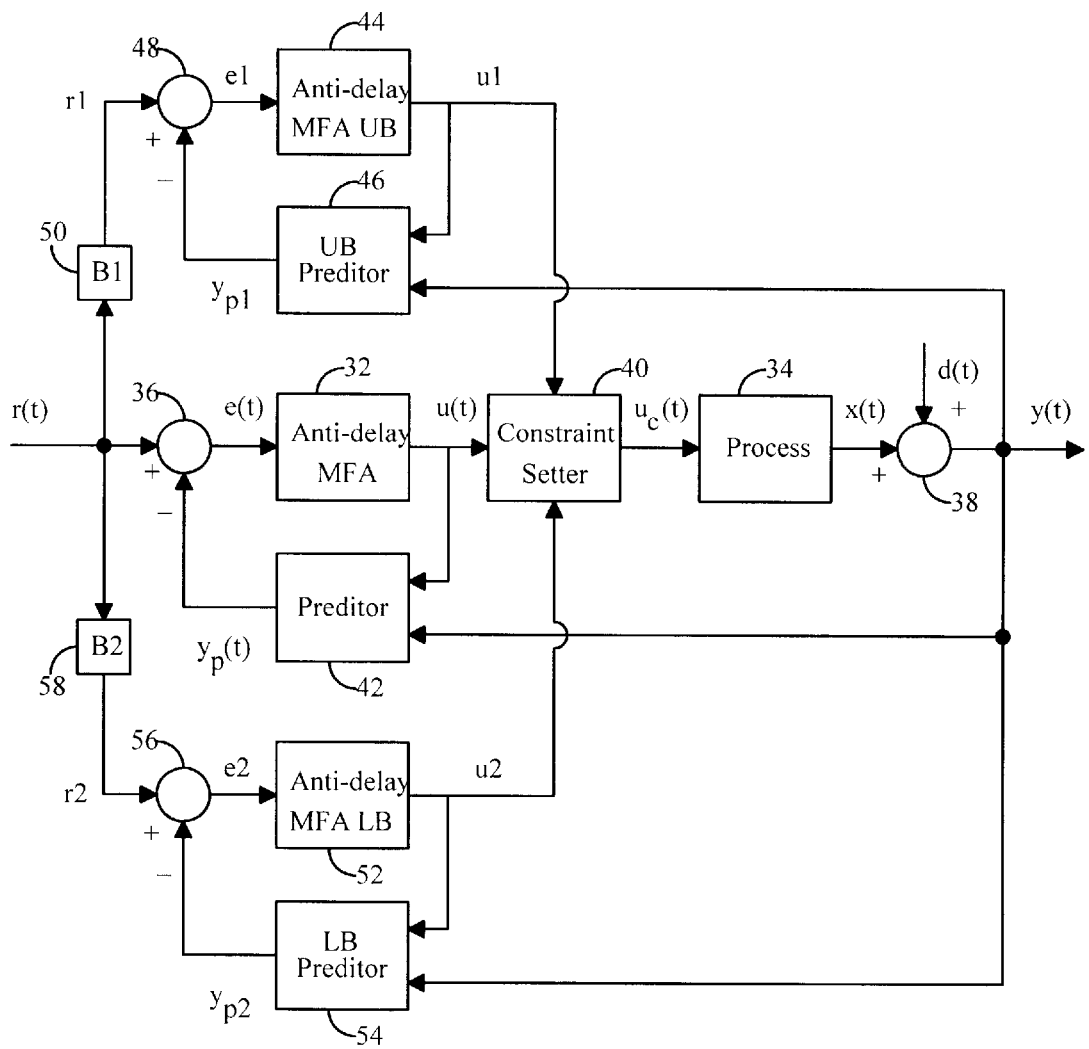
FIG. 4 is a block diagram illustrating a single-variable anti-delay robust model-free adaptive control system according to this invention.

FIG. 4 illustrates a single variable Anti-delay Robust MFA control system which includes an MFA controller 32 as the primary controller, predictor 42 for predicting the large time delays, SISO process 34, and signal adders 36 and 38. The functions of elements 32, 34, 36, 38, and 42 have been described in the patent applications, Ser. No. 08/944,450 and Ser. No. 09/143,165, which are herein incorporated by reference. As disclosed in more detail in the above patent applications, the predictor can produce an e(t) signal for the controller and let it "feel" its control effect without much delay so that the controller will wait and not over react during the period of the delay time.

Accordingly, the system also consists of a UB controller 44, UB Predictor 46, LB controller 52, LB Predictor 54, signal adders 48 and 56, constraint setter 40, and bound setters 50 and 58. The control output u(t) is bounded by the outputs of the UB and LB controllers. The design aspects of the constraint controllers, bounds, bound zones, and control limits are the same as described in the single variable case of the robust MFA control system.

1. Constraint Controller Parameters

Compared to the regular MFA controller, the Anti-delay MFA controller has the following parameters as described in patent application "Model-Free Adaptive Control for Quality Variables," filed on Apr. 11, 2000.

Kc—MFA controller Gain

Tc—MFA controller Time Constant $\tau$—Anti-delay MFA delay time

Ip—Anti-delay MFA Performance Index

If the primary controller is set with parameters Kc, Tc, $\tau$ and Ip, the constraint controllers use the same Kc and Tc. The other two parameters can be set based on the following formula:

$$\tau_1=\gamma_1\tau \quad (14b)$$

$$Ip_1=\eta_1 Ip \quad (14b)$$

$$\tau_2=\gamma_2\tau \quad (15a)$$

$$Ip_2=\eta_2 Ip \quad (16b)$$

where $\tau_1$, $\tau_2$, $Ip_1$, and $Ip_2$, are the MFA Process Time Delay and Performance Index for the UB and LB constraint controllers, respectively; and $\gamma_1$, $\gamma_2$, $\eta_1$, and $\eta_2$ are positive coefficients that can be pre-set with default values or re-configured by the user.

Typically, we can let $\gamma_1=\gamma_2=1$, and $\eta_1=\eta_2=2$. That means, the delay predictor will behave the same but the constraint controllers will be much more active compared to the Primary controller.

C. MIMO Robust Model-Free Adaptive Control System

Figure 5:
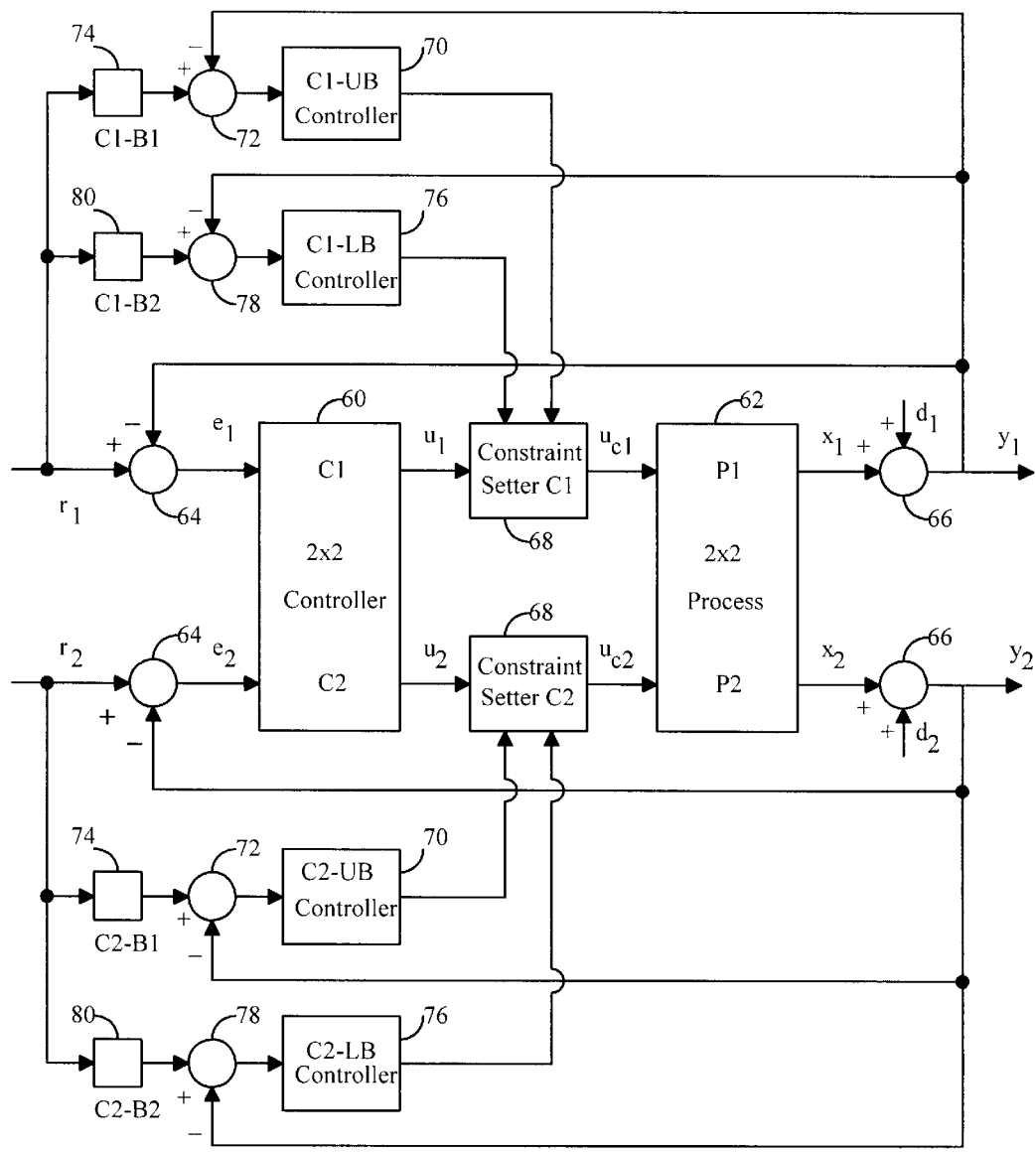
FIG. 5 is a block diagram illustrating a 2×2 robust model-free adaptive control system according to this invention.

Without losing generality, FIG. 5 illustrates a multivariable Robust MFA control system which includes a multivariable MFA controller 60, a multi-input-multi-output (MIMO) process 62, and signal adders 64 and 66. The functions of elements 60, 62, 64, and 66 have been described in the patent applications, Ser. No. 08/944,450 and Ser. No. 09/143,165.

Similar to the single-variable case, the system also consists of UB controllers 70, LB controllers 76, constraint setters 68, signal adders 72 and 78, and bound setters 74 and 80. The control outputs $u_1$ and $u_2$ are bounded by the outputs of their corresponding UB and LB controllers, respectively. The design aspects of the constraint controllers, bounds, bound zones, and control limits are the same as described in the single variable case of the robust MFA control system.

D. MIMO Anti-delay Robust Model-Free Adaptive Control System

Figure 6:
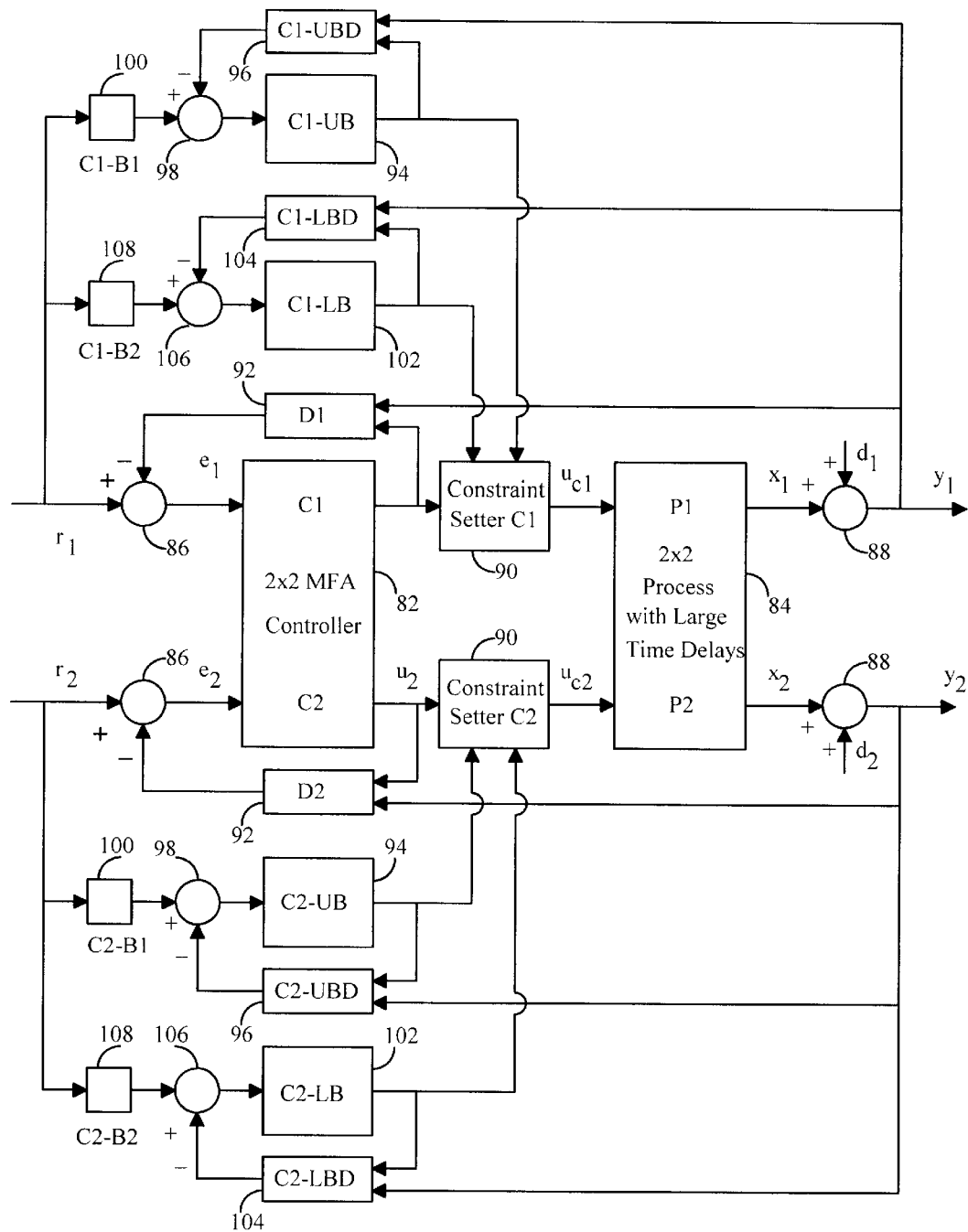
FIG. 6 is a block diagram illustrating a 2×2 anti-delay robust model-free adaptive control system according to this invention.

Without losing generality, FIG. 6 illustrates a multivariable Anti-delay Robust MFA control system which includes a multivariable MFA controller 82, a MIMO process 84, predictors 92, and signal adders 86 and 88. The functions of elements 82, 84, 86, 88, and 92 have been described in the patent applications, Ser. No. 08/944,450 and Ser. No. 09/143,165.

Similar to the single-variable case, the system also consists of UB controllers 94, LB controllers 102, predictors 96 and 104, constraint setters 90, signal adders 98 and 106, and bound setters 100 and 108. The control outputs $u_1$ and $u_2$ are bounded by the outputs of their corresponding UB and LB controllers, respectively. The design aspects of the constraint controllers, bounds, bound zones, and control limits are the same as described in the single variable case of the robust Anti-delay MFA control system.

E. Example of Robust MFA Control for a Batch Reactor

Figure 7:
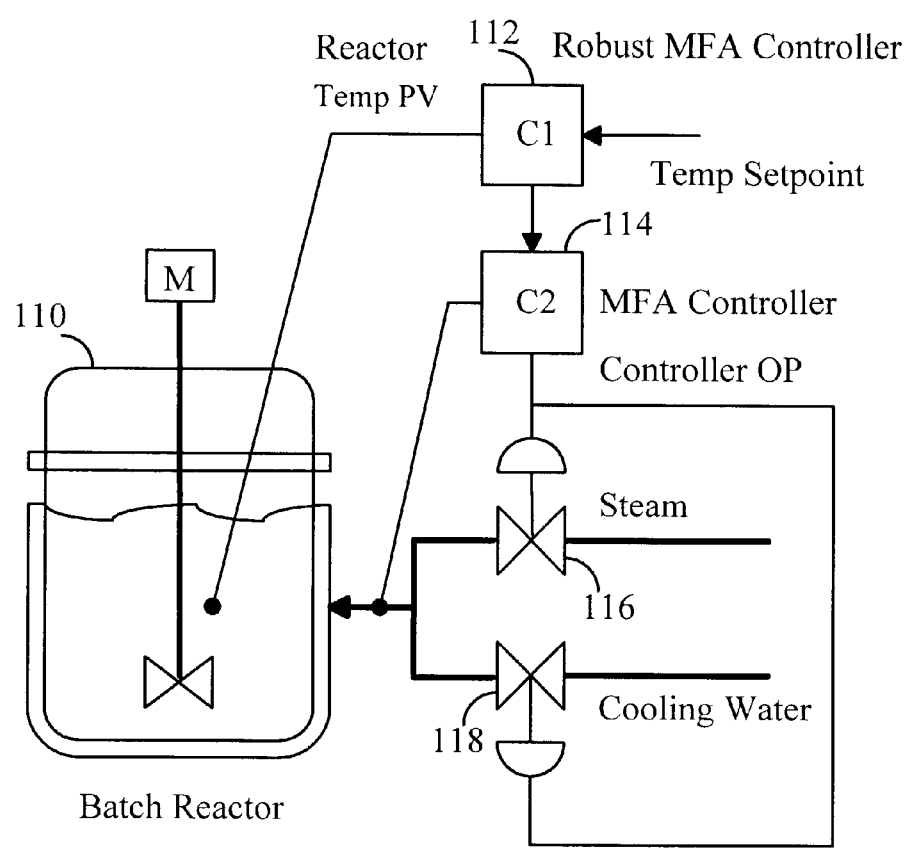
FIG. 7 is a process diagram illustrating a batch reactor robust model-free adaptive control system according to this invention.

A robust model-free adaptive control system for a batch reactor 110 is shown in FIG. 7. The temperature Controller $C_1$ 112 is cascaded with the flow Controller $C_2$ 114, which is used to control both steam flow rate for the heating process and cooling water flow rate for the cooling process. Two control valves 116 and 118 are used respectively during the heating and cooling operating conditions. The problem is that the static gain of the steam loop ($K_1$) and cooling water loop ($K_2$) can be quite different. A model-free adaptive controller introduced in previous patent applications is able to deal with the gain changes adaptively without the need to re-tune the controller.

However, the temperature controller $C_1$ faces a much more difficult task. The reactor pressure, material composition, reaction stage, and catalyst activity can vary widely due to temperature changes. The disturbances can then affect the reaction resulting in temperature variations. These chain reactions can create a vicious cycle causing the process to run away. In addition, for flexible production, the same reactor is used to produce different products. The recipe and batch changes can result in large process dynamic changes. The production changeover causes major disturbances to the energy and material balance making the system even harder to control.

It is very difficult to apply traditional PID control or model-based advanced control technologies to control this process effectively. Even the regular MFA controller introduced in previous patents may not be able to provide quick enough control action and wide enough robust range for controlling the reactor temperature. Therefore, we select Robust MFA for $C_1$ and regular MFA for $C_2$. Robust model-free adaptive control is very well suited for this application due to the following reasons:

The robust MFA, as a model-free adaptive controller, does not require process model, identification, controller design, nor complicated manual tuning;

It can deal with poor process behavior such as nonlinear, large time delays, and large disturbances.

It can provide a much wider robust range to keep the system in automatic control under normal and extreme operating conditions;

Controller configuration, commissioning, and maintenance are simple.

I claim:

1. A robust model-free adaptive control system, comprising:
   a) a model-free adaptive primary controller having a primary control output;
   b) at least one model-free adaptive boundary controller having a boundary control output;
   c) a constraint setter; and
   d) a process controlled by said controllers and having a control input which is the output of said constraint setter, and a process variable which is the sum of the output of said process and any disturbances thereto;
   e) each of said model-free adaptive controllers having as its input the difference value of a predetermined setpoint and a function of said process variable; and
   f) said constraint setter being operative to connect said primary control output to said control input of said process as long as said primary control output is within a predetermined limit, and to connect said boundary control output to said control input of said process when said primary control input is outside said predetermined limit.

2. The system of claim 1, in which the setpoint of said boundary controller is a function of the setpoint of said primary controller.

3. The system of claim 1, comprising upper and lower boundary controllers, the setpoints of said upper and lower boundary controllers being independently settable.

4. The system of claim 1, in which said constraint setter is further operative, following a transfer of said process control input from said primary control output to said boundary control output, to block retransfer of said boundary control output to said primary control output until said primary control output has returned to a predetermined value inside said predetermined limit.

5. The system of claim 1, in which said boundary controller has a substantially stronger gain and a substantially shorter reaction time than said primary controller.

6. The system of claim 1, in which said boundary controllers include a set of selectable control limits arranged to provide selectable starting conditions for said boundary controllers' outputs.

7. The system of claim 1, in which said boundary controllers are set based on the formulas $$K_{c1}=\alpha_1 K_c$$

$$T_{c1}=\beta_1 T_c$$

$$K_{c2}=\alpha_2 K_c$$

$$T_{c2}=\beta_2 T_c$$

wherein $K_c$ and $T_c$ are the controller gain and time constant of said primary controller; $K_{c1}$, $K_{c2}$, $T_{c1}$, and $T_{c2}$ are the controller gain and time constant of said upper and lower boundary controllers, respectively; and $\alpha_1$, $\alpha_2$, $\beta_1$, and $\beta_2$ are selectable positive coefficients.

8. The system of claim 1, further comprising a delay predictor associated with each of said controllers, the inputs of said delay predictor being the control output of the associated controller and said process variable, and the input to said associated controller being the difference value of said setpoint and the output of said delay predictor.

9. The system of claim 1, in which said boundary controllers with delay predictors are set based on the formulas $$K_{c1}=\alpha_1 K_c$$

$$T_{c1}=\beta_1 T_c$$

$$K_{c2}=\alpha_2 K_c$$

$$T_{c2}=\beta_2 T_c$$

$$\tau_1=\gamma_1\tau$$

$$Ip_1=\eta_1 Ip$$

$$\tau_2=\gamma_2\tau$$

$$Ip_2=\eta_2 Ip$$

wherein $K_c$, $T_c$, $\tau$, and $Ip$ are the controller gain, time constant, delay time, and performance index of said primary controller; $K_{c1}$, $K_{c2}$, $T_{c1}$, and $T_{c2}$ are the controller gain and time constant of said upper and lower boundary controllers, respectively; $\tau_1$, $\tau_2$, $Ip_1$, and $Ip_2$, are the delay time and performance index of said upper and lower boundary controllers, respectively; and $\alpha_1$, $\alpha_2$, $\beta_1$, $\beta_2$, $\gamma_1$, $\gamma_2$, $\eta_1$, and $\eta_2$ are selectable positive coefficients.

10. A robust multiple-input-multiple-output model-free adaptive control system for a plurality of interrelated processes, comprising:
   a) a model-free adaptive primary controller having a plurality of primary control outputs;
   b) a plurality of constraint setters;
   c) a plurality of interrelated processes controlled by said controllers, each of said processes having a control input and a process variable which is the sum of the process' output and any disturbance thereto; and
   d) a plurality of model-free adaptive boundary controllers each being associated with one of said processes and having a boundary control output;
   e) each of said model-free adaptive controllers having as its input the difference value of a predetermined setpoint and a function of the process variable of the process associated therewith;
   f) each of said constraint setters being operative to connect one of said primary control outputs to said control input of an associated one of said processes as long as said one of said primary control outputs is within a predetermined limit, and to connect a boundary control output to said control input of an associated process when said one of said primary control outputs is outside said predetermined limit.

11. The system of claim 10, further comprising a delay predictor associated with each of said controllers, the inputs of said delay predictor being the control output of the associated controller and said process variable, and the input to said associated controller being the difference value of said setpoint and the output of said delay predictor.

12. The system of claim 10, in which the setpoints of said boundary controllers are functions of the setpoints of said primary controllers.

13. The system of claim 10, comprising upper and lower boundary controllers, the setpoints of said upper and lower boundary controllers being independently settable.

14. The system of claim 10, in which said constraint setters are further operative, following a transfer of said process control inputs from said primary control outputs to said boundary control outputs, to block retransfer of said boundary control outputs to said primary control outputs until said primary control outputs have returned to predetermined values inside said predetermined limits.

15. The system of claim 10, in which said boundary controllers have a substantially stronger gain and a substantially shorter reaction time than said primary controllers.

16. The system of claim 10, in which each of said boundary controllers includes a set of selectable control limits arranged to provide selectable starting conditions for said boundary controllers' outputs.

17. The system of claim 10, further comprising a delay predictor associated with each of said controllers, the inputs of said delay predictor being the control output of the associated controller and said process variable, and the input to said associated controller being the difference value between said setpoint and the output of said delay predictor.

* * * * *